(12) United States Patent
Furrer et al.

(10) Patent No.: US 7,860,204 B2
(45) Date of Patent: Dec. 28, 2010

(54) DIGITAL BASEBAND SYSTEM

(75) Inventors: Simeon Furrer, Adliswil (CH); Dietrich Maiwald, Waedenswil (CH); Wolfgang H. Schott, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 2261 days.

(21) Appl. No.: 10/614,523

(22) Filed: Jul. 3, 2003

(65) Prior Publication Data

US 2004/0076156 A1  Apr. 22, 2004

(51) Int. Cl.
*H04L 7/00*  (2006.01)
*H04L 23/00*  (2006.01)
*H04L 12/26*  (2006.01)
*H04L 12/56*  (2006.01)

(52) U.S. Cl. ............... 375/358; 375/377; 370/230; 370/419

(58) Field of Classification Search ........... 375/219, 375/354, 359, 372, 135, 136, 377, 220, 222, 375/358; 455/259, 553.1; 398/128, 130; 370/389, 503, 419, 423, 463, 278, 282, 535, 370/229–236, 237, 252, 275; 709/233, 234; 712/39, 43, 219, 229; 711/E12.049, E12.089; 710/106

See application file for complete search history.

(56) References Cited

U.S. PATENT DOCUMENTS

| | | | | |
|---|---|---|---|---|
| 4,686,668 A * | 8/1987 | Koseki et al. | ............... | 370/249 |
| 5,299,193 A * | 3/1994 | Szczepanek | ............... | 370/463 |
| 5,301,275 A * | 4/1994 | Vanbuskirk et al. | ........... | 710/48 |
| 5,319,754 A * | 6/1994 | Meinecke et al. | ............. | 710/52 |
| 5,349,647 A * | 9/1994 | Freiburg et al. | ............ | 358/1.16 |
| 5,390,298 A * | 2/1995 | Kuszmaul et al. | ............. | 712/22 |
| 5,590,323 A * | 12/1996 | Kartalopoulos | ............. | 718/106 |
| 5,619,544 A * | 4/1997 | Lewis et al. | .................. | 375/377 |
| 5,682,157 A * | 10/1997 | Asmussen et al. | ............. | 341/68 |
| 5,734,808 A * | 3/1998 | Takeda | ........................ | 345/419 |
| 5,898,671 A * | 4/1999 | Hunt et al. | ................... | 370/235 |
| 6,061,367 A * | 5/2000 | Siemers | ...................... | 370/535 |
| 6,085,315 A * | 7/2000 | Fleck et al. | .................. | 712/241 |
| 6,108,713 A * | 8/2000 | Sambamurthy et al. | ..... | 709/250 |
| 6,366,622 B1 * | 4/2002 | Brown et al. | ................. | 375/322 |
| 6,457,087 B1 * | 9/2002 | Fu | .............................. | 710/305 |
| 6,587,476 B1 * | 7/2003 | Lewin et al. | ................. | 370/467 |

(Continued)

FOREIGN PATENT DOCUMENTS

JP    51-002117    1/1996

(Continued)

*Primary Examiner*—Tesfaldet Bocure
*Assistant Examiner*—Lawrence B Williams
(74) *Attorney, Agent, or Firm*—Ido Tuchman; Kenneth R. Corsello (57) ABSTRACT

Communication device for processing outgoing and incoming packets. The device includes a plurality of signal processing units connected in sequence, each signal processing unit being clocked by a common clock signal. The device further includes a mode line connected to each signal processing unit for switching each signal processing unit between a transmit mode and a receive mode. The device further includes a control line to which each signal processing unit is connected. The control line communicating flow control information either in the transmit mode to at least one of the preceding signal processing units or in the receive mode to at least one of the following signal processing units.

23 Claims, 4 Drawing Sheets

U.S. PATENT DOCUMENTS

| | | | |
|---|---|---|---|
| 6,650,880 B1 * | 11/2003 | Lee et al. | 455/259 |
| 6,728,211 B1 * | 4/2004 | Peris et al. | 370/235 |
| 6,820,145 B2 * | 11/2004 | Wingen | 710/52 |
| 6,826,225 B1 * | 11/2004 | Dupuis et al. | 375/222 |
| 7,017,064 B2 * | 3/2006 | Thomas et al. | 713/400 |
| 7,151,745 B2 * | 12/2006 | Lin et al. | 370/230 |
| 7,177,341 B2 * | 2/2007 | McCorkle | 375/130 |
| 7,200,138 B2 * | 4/2007 | Liu | 370/352 |
| 7,596,139 B2 * | 9/2009 | Patel et al. | 370/392 |
| 2002/0120831 A1 * | 8/2002 | Wong et al. | 712/219 |
| 2003/0096634 A1 * | 5/2003 | Lin | 455/560 |
| 2003/0137939 A1 * | 7/2003 | Dunning et al. | 370/235 |

FOREIGN PATENT DOCUMENTS

| | | |
|---|---|---|
| JP | 08-307396 | 11/1996 |

* cited by examiner

DIGITAL BASEBAND SYSTEM

TECHNICAL FIELD AND BACKGROUND OF THE INVENTION

The present invention relates to a communication system for processing outgoing and incoming data. More particularly the invention relates to a baseband unit for handling packets comprising a header and payload.

Although the present invention is applicable in a broad variety of communication systems it will be described with the focus put on an application to a short-range radio communication system that conforms to the Bluetooth baseband specification, as can be found in "Specification of the Bluetooth System", Version 1.0 B, Bluetooth Special Interest Group (SIG), Dec. 1, 1999.

The intensified wish to connect a wide range of computing and telecommunications devices easily and simply, without the need to buy, carry, or connect cables, has been realized by several companies. The Bluetooth Special Interest Group (SIG) and the IEEE Wireless Personal Area Network (WPAN) standardization group 802.15 are working on a specification of a short-range radio communication system for enabling wireless ad-hoc connectivity between portable and/or fixed electronic consumer products such as computers, cellular phones, printers, and digital cameras. This communication system can manage within a small local area up to three synchronous connection-oriented (SCO) links mainly for speech transmission at a rate of 64 kbit/s, and up to seven asynchronous connectionless (ACL) links supporting symmetric or asymmetric data transfers at a maximum rate of 433.9 and 723.2 kbit/s, respectively. The radio subsystem is operated in the globally available unlicensed industrial, scientific, and medical (ISM) frequency band at 2.4 GHz, covers distances of up to 10 meters with a transmission power of less than 1 mW, and applies frequency hopping in conjunction with a time-division multiple access (TDMA) scheme for transmitting data at a symbol rate of 1 Mbit/s over the air. Crucial for the acceptance of this new communication technology in commercial products is the design of a low-power, small-sized, low-cost radio subsystem that can be embedded in existing and future, portable and fixed electronic consumer devices.

Known architectures for Bluetooth transceivers use several modules within a signal processing chain. Thereby, at least one signal processing chain is used for transmitting and at least another one for receiving packets. For example, in the transmitter chain, user synchronous, user asynchronous, or user isochronous data are sent via corresponding logical channels to transmit buffers for synchronous connection-oriented (SCO) links and buffers for asynchronous connectionless (ACL) links. Control information stemming from a link manager protocol, as described in the Specification of the Bluetooth System, can also be fed to the ACL buffers. The stored information in each of the multiple ACL and SCO buffers represents the payload to be transmitted over the link. Before its transmission, the payload is processed by appending cyclic redundancy check (CRC) bits, ciphering, whitening, and optionally encoding with a rate 1/3 or 2/3 forward error correction (FEC) code. The latter can be achieved by a CRC generator, an encryption module, a whitening filter, and an FEC encoding module. In parallel, the packet header is assembled by a link controller and stored in a transmit header register. The header is processed by appending error check (HEC) bits from a HEC generator, whitened with a respective filter, and encoded with a rate 1/3 FEC code with a respective FEC encoding module. A radio frame is obtained by first concatenating the filtered and coded header and payload information, and then preceding the resulting bit string with an access code. Finally, the radio frame is forwarded to an analog radio frontend for its transmission at a frequency f(n). The value of f(n) is provided by a hopping frequency selection block.

A corresponding receiver chain might have the following features. When an access code correlator detects the arrival of a radio frame at a frequency f(n), a trigger event starts the processing in the receiver chain. The header information is extracted from the received frame, decoded with an FEC decoder, dewhitened with a dewhitening filter, checked by a HEC checking module, and stored in a receive header register. When the HEC check is successful, the receiver can start decoding, dewhitening, deciphering, and CRC checking the payload information with an FEC decoder, dewhitening filter, decryption module and a CRC checking module, respectively. When the CRC check is successful, the packet is stored in either a receive SCO buffer or ACL buffer depending on the received packet type. From the receive buffer, the payload is carried via the logical channels for user synchronous, user asynchronous, or user isochronous data to the synchronous or asynchronous I/O port. If link manager control information has been received in the receive ACL buffer, it is forwarded to the link manager protocol.

A link controller configures, monitors, and controls the transmitter and receiver chain so that the baseband can be operated in several states.

Known disadvantages of current implementations of digital baseband systems based on rate-conversion between successive signal processing modules are the rate-conversion delay, the rate-conversion logic-overhead and power consumption.

Known buffer implementations have the disadvantage of memory inefficiency for variable length packets and a lack of addressability and allocation flexibility.

It is thus an object of the present invention to overcome the disadvantages of the state of the art and to provide a low-power, small-sized, low-cost baseband system that can be used in existing and future devices.

SUMMARY AND ADVANTAGES OF THE INVENTION

The invention provides a baseband system for a short-range radio communication system. It is conform to the Bluetooth baseband specification and is well-suited for an efficient hardware implementation, providing a low-power, small-sized, and low-cost radio subsystem design. The baseband system comprises a transceiver unit and a buffer unit, whereby the system has an efficient gate count and a reduced power consumption.

The design of a transceiver unit is based on a pipelined signal processing with distributed data path flow control. The transceiver unit processes outgoing and incoming packets, and comprises a plurality of signal processing units connected in sequence, whereby each signal processing unit is clocked by a common clock signal. A mode line is connected to each signal processing unit for switching each signal processing unit between a transmit mode and a receive mode. A control line to which each signal processing unit is connected communicates flow control information either in the transmit mode to one or more of the preceding signal processing units or in the receive mode to one or more of the following signal processing units. The described device can also be implemented as a transmitter or receiver only, whereby then the mode line can be omitted.

The buffer unit comprises a buffer system that applies a flexible memory organization concept, which leads to an efficient implementation of buffers or storage elements in terms of gate count and power consumption, and offers the flexibility to dynamically allocate memory for variable length user packets.

The buffer system for storing data of the first processing unit and second processing unit comprises a plurality of storage elements, whereby each storage element has a first storage unit and a second storage unit. A switch subsystem is provided for switching each storage element between first and second modes. Each first storage unit is addressable in the first mode by the first processing unit while each second storage unit is addressable in the first mode by the second processing unit. Each second storage unit is addressable in the second mode by the first processing unit while each first storage unit is addressable in the second mode by the second processing unit.

Each signal processing unit can comprise a multiplexing unit for the purpose of enabling multiple signals to be processed or generated by one signal processing unit. Moreover, each signal processing unit can comprise a multiplexer at its input and a demultiplexer at its output. Such a structure shows the advantage that each signal processing unit can be used for transmit and receive mode, allowing a partial reuse of functions and gates.

Each signal processing unit can be connected via a logic unit to the control line. This structure shows the advantage that other signal processing units can be informed and temporarily stopped easily if a processing delay occurs. Moreover, physically the same control line and logic unit can be used for receive and transmit mode.

If the logic unit comprises an OR gate, than a simple structure can be achieved.

The flow control information can comprise a hold information indicating to the signal processing units receiving the hold information to stop processing. By doing so, an efficient mechanism can be implemented to temporarily stop the processing.

Each signal processing unit can be used for the transmit and receive mode. This has the advantage that only one signal processing chain has to be build, whereby gate count can be saved.

When each storage element comprises a plurality of cells for storing data, then a simple structure of the storage element can be achieved.

A first address decoder can select one storage element for writing and reading data by the first processing unit. A second address decoder can select one storage element for writing and reading data by the second processing unit. By using such a structure, each or multiple storage element(s) can be addressed independently. This leads to a flexible allocation and selection of storage blocks.

The switch subsystem can comprise a plurality of access switches. Each access switch is connected to one storage element. Such structure takes the advantage that a flexible access can be achieved.

If a controller unit has an access switch register for controlling each access switch, then the advantage occurs that a simple control mechanism can be implemented to control the access switches.

A method for storing data of a first processing unit and second processing unit in a buffer system comprising a plurality of storage elements is provided. Each storage element comprises a first storage unit and a second storage unit. The method comprises the steps of switching each storage element between first and second modes, in the first mode addressing each first storage unit by the first processing unit and addressing each second storage unit by the second processing unit, and in the second mode addressing each second storage unit by the first processing unit and addressing each first storage unit by the second processing unit.

The method can further comprise selecting multiple storage elements and combining them to one or more storage blocks. This has the advantage that memory can be dynamically allocated for single and/or multi-slot packets. The size of the selectable memory is flexible.

Each storage element and each storage block can be used independently. This leads to a broad flexibility in using the memory.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

DETAILED DESCRIPTION OF THE INVENTION

Although the present invention is applicable in a broad variety of communication systems it will be described with the focus put on an embodiment to a short-range radio communication system that conforms to the Bluetooth baseband specification. In the figures, same reference numerals are used to denote the same or like parts.

Figure 1:
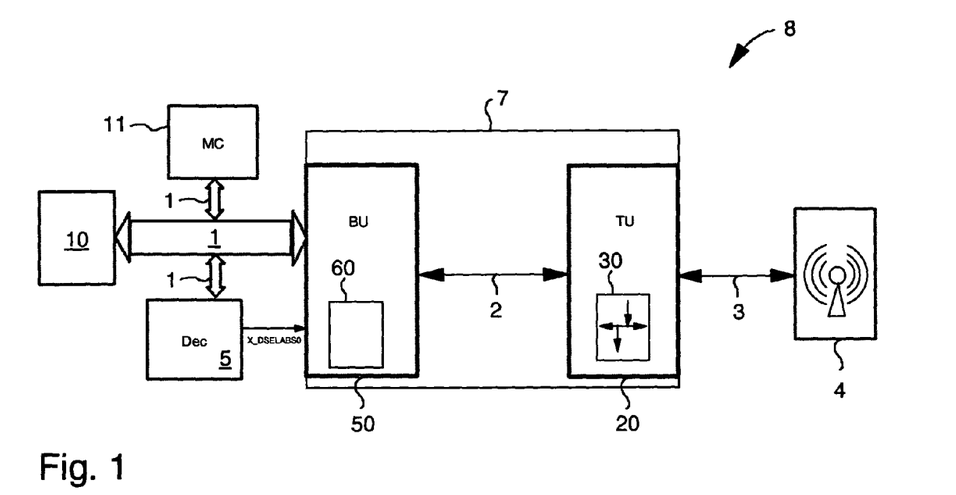
FIG. 1 shows a schematic illustration of components of a baseband system of an embodiment according to the present invention.

FIG. 1 illustrates mapping of a baseband architecture onto a hardware/firmware platform that implements a baseband system 8 of the short-range radio communication system. A link manager and link controller, which for the sake of clarity are not shown in the figure, are implemented in firmware. Code is executed on a real-time operating system on an embedded microcontroller 11 that is interconnected via a system bus 1 with a bus decoder 5, and not shown devices, such as memory devices, bus arbiter, interrupt controller, timers, and external interfaces. The embedded microcontroller 11 can be an ARM7TDMI microcontroller. An AMBA advanced system bus (ASB) can be applied as the system bus 1, whereby AMBA stands for Advanced Microcontroller Bus Architecture that is described in "AMBA Specification Rev. D", Advanced RISC Machines Ltd. (ARM), Cambridge UK, April 1997. The system bus 1 is connected to a peripheral unit 10, hereafter also called first processing unit 10, which can be a speech encoder/decoder or a data source/sink, and a baseband unit 7 comprising a buffer unit 50 and a transceiver unit 20. The buffer unit 50 comprises a buffer system 60 and is interconnected through a transceiver bus 2 to a transceiver unit 20. The transceiver unit 20 comprises a communication device 30 for signal processing, that hereafter is called transceiver signal-processing chain device 30. It is connected to an analog radio frontend 4 via an RF (radio frontend) interface 3.

The buffer unit 50 implements transmit (TX) and receive (RX) buffers, whereas the transceiver unit 20 performs all digital signal-processing functions of a transmitter and receiver chain. The buffer unit 50, the first processing unit 10, and the firmware executed on the microcontroller 11 communicate with each other via the system bus 1. The buffer unit 50 can thus be implemented as an ASB slave peripheral, which allows the mapping of all hardware registers and buffers into the microcontroller's address space and the generation of ARM7TDMI interrupts for time-critical events in the hardware.

Figure 2:
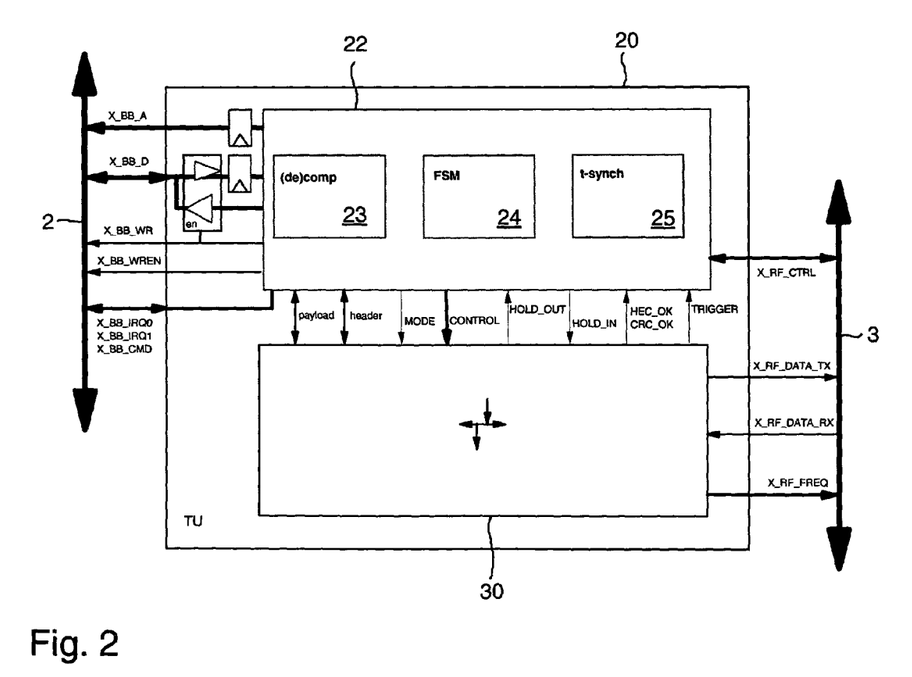
FIG. 2 shows a schematic illustration of a transceiver unit of an embodiment according to the present invention.

FIG. 2 depicts a block diagram of the transceiver unit 20 for the short-range communication system. It comprises the transceiver signal-processing chain device 30 interconnected to a transceiver controller 22 that includes a packet (de)composer 23, a transceiver finite state machine 24, and a time synchronization unit 25.

The transceiver unit 20 communicates via the transceiver bus 2 with the buffer unit 50. Data can be written or read via a data bus, labeled with X_BB_D, to or from a respective payload buffer with an address indicated on the bus X_BB_A by controlling the signals X_BB_WR and X_BB_WREN. The signals X_BB_CMD control the transceiver finite state machine 24 of the transceiver unit 20, whereas the signals X_BB_IRQ0 and X_BB_IRQ1 indicate to a not shown baseband interrupt controller that a clock event has occurred or a packet reception event has been detected in the transceiver signal-processing chain device 30, respectively.

The transceiver unit 20 communicates via the RF interface 3 with the radio frontend 4. The transceiver signal-processing chain device 30 outputs a radio frame as a serial bitstream at the interface line X_RF_DATA_TX, while interface line X_RF_DATA_RX is used for processing an incoming radio frame. The outgoing and incoming radio frames are transmitted or received over the radio link at a frequency indicated by the interface lines X_RF_FREQ. Control information is exchanged on lines X_RF_CTRL between the radio frontend 4 and the transceiver unit 20.

In the transceiver controller 22, timing synchronization between two or more communicating devices (not shown) is carried out, the transceiver signal-processing steps are sequenced with the transceiver finite state machine 24, and outgoing and incoming packets are assembled and disassembled with the packet (de)composer 23. While transmitting data, the packet composer 23 reads via the transceiver bus 2 proper header registers and addressed payload data buffers, serializes 32 bit wide information blocks, and shifts the resulting serial bitstring into the transceiver signal-processing chain device 30. While receiving data, the incoming bitstring is processed and finally converted serial-to-parallel by the packet (de)composer 23 before the information blocks are stored either into a header register or the addressable buffers, which is further described below.

As indicated by the arrows, payload and header data are exchanged between the transceiver controller 22 and the transceiver signal-processing chain device 30. Furthermore, MODE, CONTROL, HOLD_OUT, HOLD_IN, HEC_OK, CRC_OK, and TRIGGER signals are communicated between the transceiver controller 22 and the transceiver signal-processing chain device 30.

Figure 3:
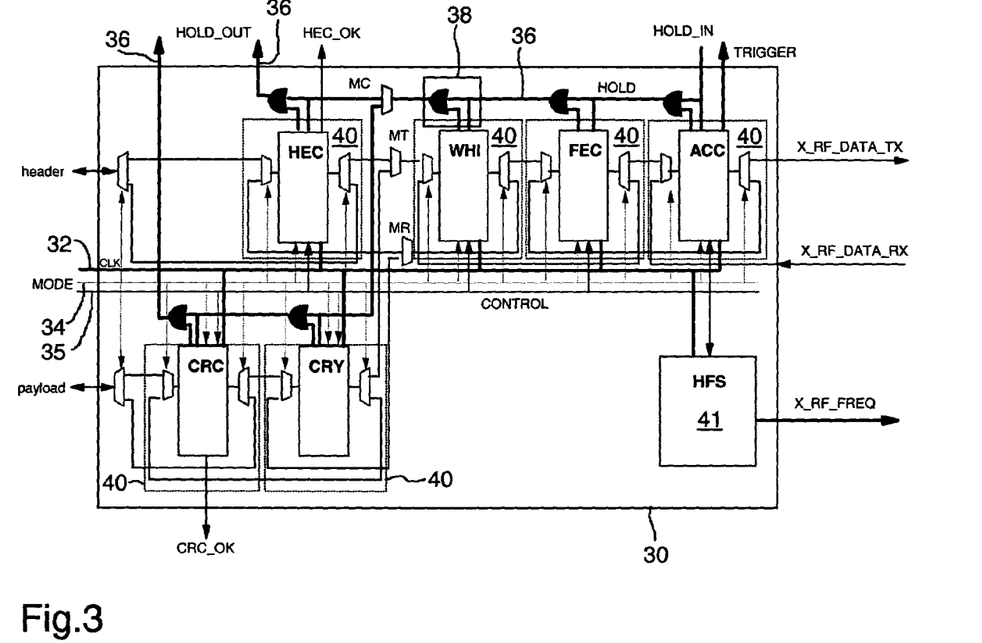
FIG. 3 shows a schematic illustration of a transceiver signal processing chain device of an embodiment according to the present invention.

Referring to FIG. 3, which shows a schematic illustration of a transceiver signal-processing chain device 30, hereafter short communication device 30. The communication device 30 comprises several signal processing units 40 required for implementing the functions header error check (HEC), whitening (WHI), forward error correction (FEC), access code correlation (ACC), cyclic redundancy check (CRC), and encryption (CRY), whereby the boxes are labeled accordingly. Each signal processing unit 40 comprises one multiplexing unit 42, 43 at its input and output which are depicted in more detail in FIG. 4. The signal processing units 40 are connected in sequence, whereby each is clocked by a common clock signal provided on a clock line 32. Furthermore, each signal processing unit 40 is connected to a mode line 34, a data bus 35, and a control line 36. The control signals MODE, HOLD_IN, and HOLD_OUT together with the data bus 35 are used to configure and steer the signal processing units 40 within the transceiver chain. A hopping frequency selection is carried out by a hopping frequency unit 41, labeled with HFS.

The transceiver finite state machine 24 can configure the communication device 30 for transmit and receive mode by controlling the muliplexors 42, demultiplexors 43, and signal processing units 40 with the signal MODE on the mode line 34. In transmit mode, the signal processing units 40 are configured and connected with each other such that a radio frame is generated from the header and payload. A transmit multiplexer, labeled with MT, is provided to combine header and payload path. The frame is output as a serial continuous bitstring at the RF interface line X_RF_DATA_TX at a rate of 1 Mbit/s. In receive mode, the signal processing units 40 are configured and connected such that an incoming radio frame at line X_RF_DATA_RX is processed by the signal processing units 40 in reversed order before it is forwarded as header and payload to the packet decomposer 23. A receive demultiplexer, labeled with MR, is thus arranged to divide the bitstream into header and payload.

The signal-processing chain of the communication device 30 bases on a pipelined signal-processing architecture with data path flow control, hereafter called flow control information, which is communicated via the control line 36. All signal processing units 40 in the pipeline use the same signal-processing building block structure and are clocked with the common clock signal of 1 MHz. By using a feedback flow control mechanism in the transmit path and a feedforward control in the receive path, a continuous 1 Mbit/s bitstream can be provided to and accepted from the RF interface 3 respectively, avoiding a costly data-rate conversion between input and output of each signal processing unit 40. The flow control information is forwarded to the next or fed back to the previous signal processing unit 40 via logic units 38 comprising OR gates. A control demultiplexer, labeled with MC, is arranged within the control line 36 in order to split the flow control information for header and payload path.

Figure 4:
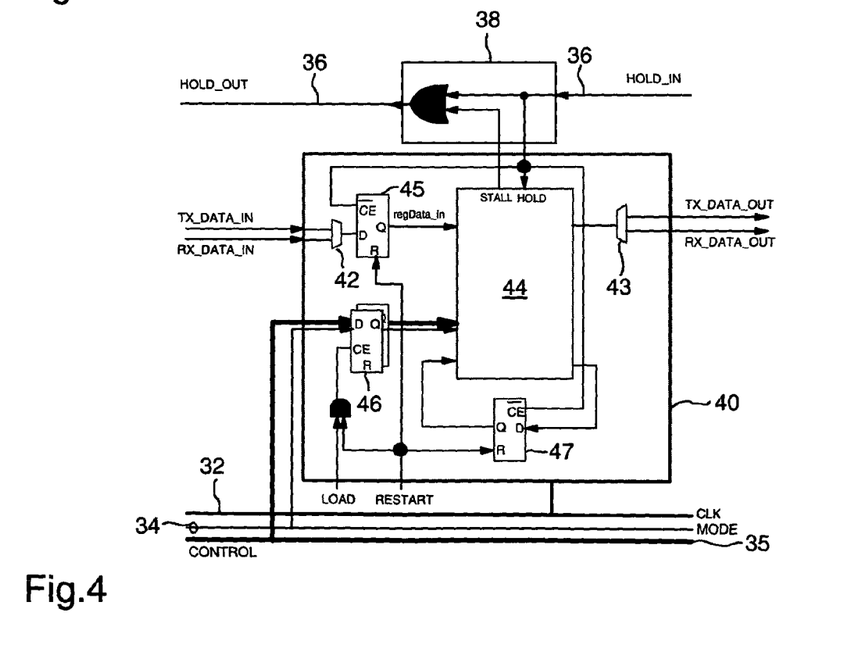
FIG. 4 shows details of a signal processing unit with its connection lines of an embodiment according to the present invention.

FIG. 4 shows details of the general structure of one signal processing unit 40. It comprises here a combinatorial logic unit 44, a data input register 45, two configuration registers 46, and a state register 47 which are synchronously clocked by the clock signal provided on the clock line 32. The combinatorial logic unit 44 together with the state register 47 implements the functionality of the signal processing unit 40 required in the transmit and receive path. The signal processing unit 40 comprises a multiplexer 42 at its input to receive a bitstring either at line TX_DATA_IN or RX_DATA_IN. The multiplexer 42 is connected to the data input register 45 which provides the data to the combinatorial logic unit 44 via the regData_in line. At the output of the signal processing unit 40 a demultiplexer 43 is arranged. The demultiplexer 43 receives its input from the combinatorial logic unit 44 and outputs in dependency of the transmit or receive mode either a TX_DATA_OUT signal to the next signal processing unit 40 or a RX_DATA_OUT signal that is fed to the signal processing unit 40 following in the receive signal processing chain.

The registers 45, 46, 47 are used to serially clock in the bitstring from the multiplexer 42, to store externally loadable configuration values, and to hold and feed back state information to the input of the combinatorial logic unit 44.

Before a signal processing unit 40 can start processing data, it has to be reset and configured. By raising the signal RESTART, the data input register 45 and the state register 47 are cleared. When the two signals RESTART and LOAD are raised, the value of the external signal MODE on the mode line 34 and other module-dependent configuration parameters provided on the CONTROL data bus 35 are stored into the configuration registers 46. As soon as the signal RESTART is released, a string of bits provided at line TX_DATA_IN or RX_DATA_IN is clocked into the input register 45. From these bits and the parameters stored in the configuration and state registers 46, 47, the combinatorial logic 44 generates a bitstring, which is output via the demultiplexer 43 at line TX_DATA_OUT or RX_DATA_OUT.

The flow control information is carried on via the control line 36: Raising the signal HOLD_IN causes the logic unit 38 to raise HOLD_OUT and HOLD, which disables the clock of the data input and state registers 45, 47. In this case the signal processing unit 40 stops processing, that is, new input values are ignored, the internal state of the signal processing unit 40 is kept unchanged, and the value of the output signal is retained.

In transmit mode, the length of the output bitstring of each signal processing unit 40 is always greater than (or equal to) the length of the input bitstring because the signal processing unit 40 may perform channel encoding or append parity check bits. As both bitstrings are clocked out with the same clock rate of 1 MHz, the signal processing unit 40 has to freeze all previous signal processing units 40 in the pipeline whenever it inserts additional bits in the output bitstring. Stopping the previous signal processing units 40 is accomplished by raising the signal STALL, which propagates back on the control line 36 as a HOLD command via a logic unit 38 to the previous signal processing units 40 in the pipeline. A feedback loop thus controls the data flow in the transmit path. The STALL signal is sent and the HOLD signal is received by the combinatorial logic unit 44 via the logic unit 38. The logic unit 38 comprises here an OR gate.

In receive mode, the length of the output bitstring of each signal processing unit 40 is always less than (or equal to) the length of the input bitstring because the signal processing unit 40 may perform channel decoding or remove parity check bits. As the input and output bitstring is clocked with the same clock signal, the respective signal processing unit 40 has to indicate to the next signal processing unit 40 in the receive processing chain that no valid data is provided at its output. In this case, all preceding signal processing units 40 in the pipeline have to stop processing input data. Freezing of all subsequent signal processing units 40 in the pipeline is accomplished by raising the signal STALL, which is forwarded as a HOLD command on the control line 36 via the logic unit 38 to the next signal processing units 40. A feed-forward mechanism thus controls the data flow in the receive path.

In general, the same control line 36 can be used for transmit and receive mode. This leads to a simple structure.

Figure 5:
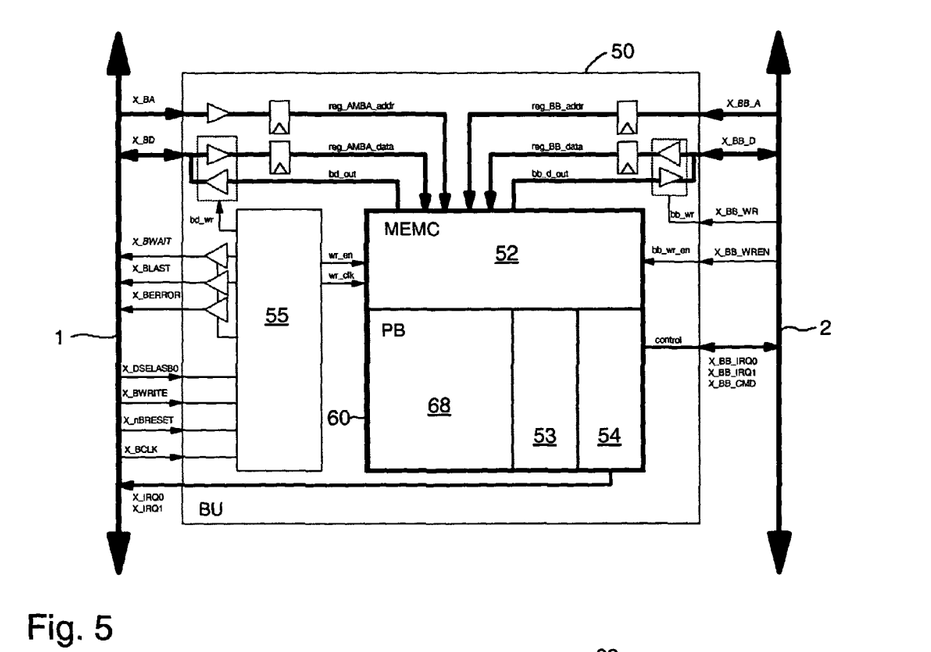
FIG. 5 shows a schematic illustration of a buffer unit of an embodiment according to the present invention.

FIG. 5 shows a schematic illustration of the buffer unit 50. The buffer unit 50 comprises an ASB slave controller 55 and a buffer system 60. The buffer system 60 comprises a memory controller 52, payload buffers 68, transceiver configuration and header storage registers 53, and control and status registers 54 required for baseband transceiver configuration, packet header storage, interrupt control, baseband control and status monitoring. The buffer unit 50 is visible as a memory-mapped device to the baseband transceiver unit 20 via the transceiver bus 2, and to the ASB master, e.g. the microcontroller 11, via the system bus 1.

The ASB slave controller 55 coordinates the control and user data exchange between one ASB master and the buffer system 60 over the AMBA bus, i.e. system bus 1. If the AMBA bus decoder 5 selects the buffer unit 50 by enabling the chip select signal X_DSELASB0, the ASB slave controller 55 processes and generates all ASB bus control signals (X_BWAIT, X_BERROR, X_BLAST, X_BWRITE, X_nBRESET, X_BLCK) required for an AMBA conform sequential or non-sequential data transfer via the bidirectional data bus X_BD to or from a memory location defined on the address bus X_BA. Moreover, the ASB slave controller 55 generates a write clock signal wr_clk and a write enable signal wr_en for the memory controller 52 and controls the data transfer direction over the data bus X_DB with the signal bd_wr. Interrupts between the buffer unit 50 and the microcontroller 11 are carried on the interface lines X_IRQ0 and X_IRQ1.

The control and user data exchange via the transceiver bus 2 between the buffer and transceiver units 50, 20 is coordinated by the transceiver finite state machine 24 implemented in the transceiver unit 20. The interface signals were indicated with reference to FIG. 2.

The transceiver configuration and header storage registers 53 are provided for configuring the transceiver unit 20 and storing the packet header information. These registers 53 are always connected to the system bus 1 and transceiver bus 2 to allow simultaneous read access from both busses; however, only one bus has write access rights. The control and status registers 54 include registers for buffer switching, transceiver control and interrupt handling. An interrupt controller of the control and status registers 54 is provided to generate microcontroller interrupt events such as the clock interrupt and a packet received interrupt.

Figure 6:
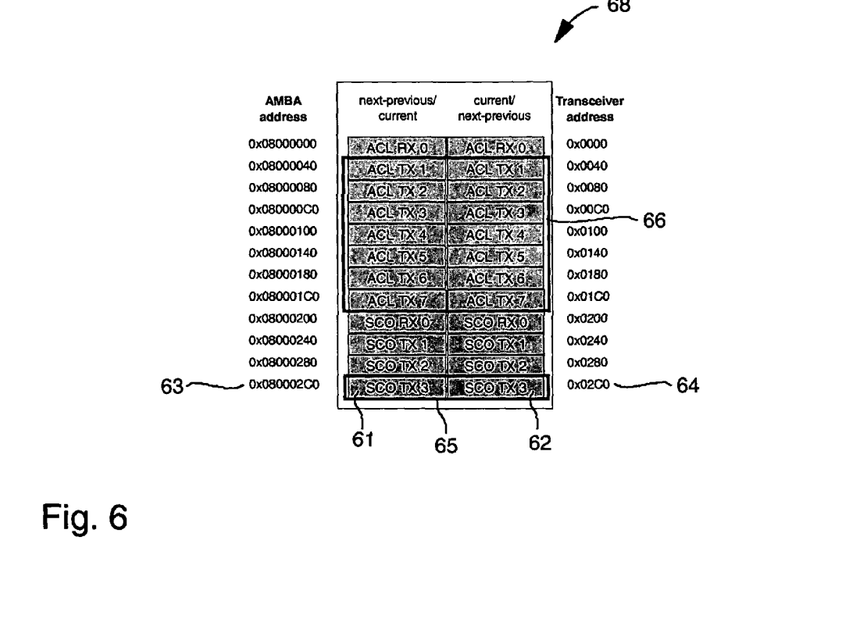
FIG. 6 shows the organization of payload buffers of an embodiment according to the present invention.

FIG. 6 show details of the organization (memory map) of payload buffers 68 within the buffer system 60. For the implementation of, for example, seven ACL TX, three SCO TX, one ACL RX, and one SCO RX payload buffers 68, an array of storage elements 65 with 12 rows and is provided. Each storage element 65 comprises a first storage unit 61 and a second storage unit 62 and can here store 64 bytes whereby it is addressable as 16 cells of 32 bits. This memory organization leads to an efficient implementation of buffers in terms of gate count and power consumption, and also offers the flexibility to dynamically allocate memory for single or multi-slot packets by selecting multiple storage elements 65 and combining them to a storage block 66. Each storage element 65 can be either in a first mode or second mode. The first row of the payload buffers 68 implements a previous and current block of an ACL RX payload buffer; the next seven rows are used for the implementation of the next and current block of seven ACL TX payload buffers; and finally four rows of memory implement one SCO RX and three SCO TX payload buffers. Each row comprises the first storage unit 61 and the second storage unit 62, one for the implementation of the current block and one for the next or previous block, respectively. Each row is addressed with a single byte address (e.g. from 0x0000h to 0x02FFh) by using a transceiver address 64 or an AMBA address 63. If the buffer system 60 is addressed via the AMBA system bus 1, the address base offset of the unit (e.g. 0x08000000h) has to be added. By using this addresses 63, 64, the transceiver unit 20 as a second processing unit 20 and any device attached to the AMBA system bus 1, e.g. the peripheral unit 10 or the microcontroller 11 as a first processing unit 10, 11, can perform read/write accesses either to the first or second storage unit 61, 62 in the addressed storage element 65. Selecting the first or second storage unit 61, 62, however, is controlled by the memory controller 52, which avoids simultaneous access from the second processing unit 20 and the first processing unit 10.

Figure 7:
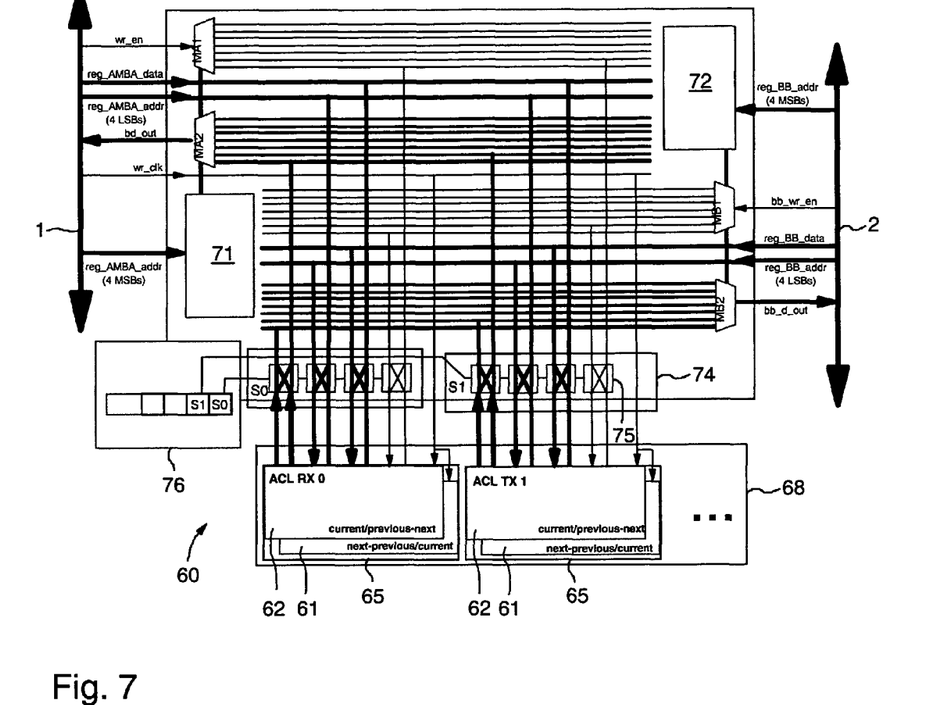
FIG. 7 shows details of a buffer system of an embodiment according to the present invention.

FIG. 7 shows further details of the memory controller 52, which encompasses first and second address decoders 71, 72 and control logic for selecting, writing, and reading data to and from the storage elements 65 and control registers 53, 54. Memory locations are addressed either from the system bus 1 or from the transceiver unit 20 via the transceiver bus 2, e.g. an 8-bit wide address bus. As the memory region can be split into an array of storage elements 65 to build a storage block 66, address decoding is performed, first, by selecting one storage element 65 based on the four most significant bits (MSBs) of the eight address bits and then selecting one out of 16 memory cells of the addressed storage element 65 based on the four remaining least significant bits (LSBs). For write access, the first address decoder 71 routes the write enable signal via the demultiplexor, labeled with MA1 or MB1, to the selected storage element 65, whereas for read access the multiplexors, labeled with MA2 and MB2, connect the addressed storage element 65 to the system bus 1 or transceiver bus 2. Switching between a first and second mode of one storage element 65 or storage block 66 is controlled by a buffer switch register 76, that is accessible by the microcontroller 11. Each single bit Si of the buffer switch register 76 controls a switch subsystem 74 comprising access switches 75 attached to one storage element 65.

Figure 8:
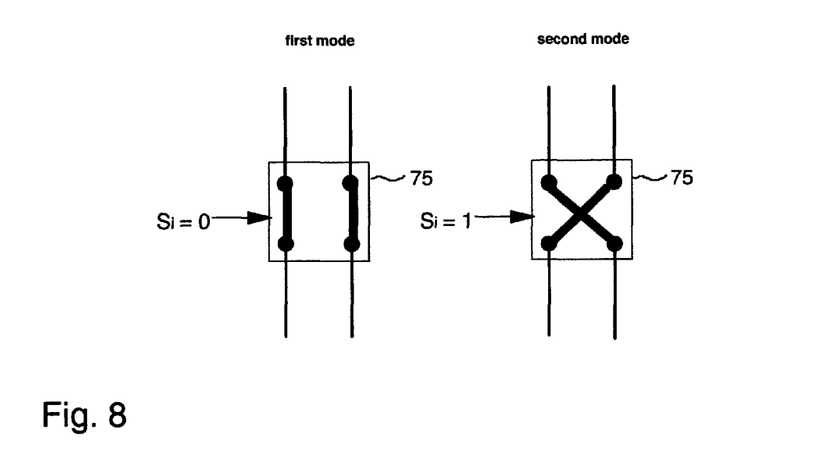
FIG. 8 shows a schematic illustration of a buffer switch of an embodiment according to the present invention.

FIG. 8 shows a schematic illustration of the possible states of one access switch 75 for achieving the first and second mode of one storage element 65 or storage block 66. Depending on the value of Si, one or more of the storage elements 65 is/are set such that data stemming either from the system bus 1 or transceiver bus 2 is written or read to the proper storage element(s) 65. The access switches 75 within one switch subsystem 74 are switched simultaneously.

Any disclosed embodiment may be combined with one or several of the other embodiments shown and/or described. This is also possible for one or more features of the embodiments.

The invention claimed is:

1. A communication device for processing outgoing and incoming packets, the device comprising:
a plurality of signal processing units connected in sequence, each signal processing unit being clocked by a common clock signal;
a mode line connected to each signal processing unit for switching each signal processing unit between a transmit mode and a receive mode; and
a control line to which each signal processing unit is connected, the control line communicating flow control information either in the transmit mode to at least one of the preceding signal processing units or in the receive mode to at least one of the following signal processing units.

2. A communication device for processing an outgoing packet, the device comprising:
a plurality of signal processing units connected in sequence, each signal processing unit being clocked by a common clock signal; and
a control line to which each signal processing unit is connected, the control line communicating flow control information to stall at least one of the preceding signal processing units for feedback control of the signal processing units.

3. A communication device for processing an incoming packet, the device comprising:
a plurality of signal processing units connected in sequence thereby forming a signal processing chain, each signal processing unit being clocked by a common clock signal; and
a control line to which each signal processing unit is connected, the control line communicating flow control information to stall at least one of the signal processing units following in the signal processing chain for feed-forward control of the signal processing units.

4. Device according to claim 1, wherein each signal processing unit comprises a multiplexing unit.

5. Device according to claim 2, wherein each signal processing unit comprises a multiplexing unit.

6. Device according to claim 3, wherein each signal processing unit comprises a multiplexing unit.

7. Device according to claim 1, wherein each signal processing unit comprises a multiplexer at its input and a demultiplexer at its output.

8. Device according to claim 2, wherein each signal processing unit comprises a multiplexer at its input and a demultiplexer at its output.

9. Device according to claim 3, wherein each signal processing unit comprises a multiplexer at its input and a demultiplexer at its output.

10. Device according to claim 1, wherein each signal processing unit is connected via a logic unit to the control line.

11. Device according to claim 2, wherein each signal processing unit is connected via a logic unit to the control line.

12. Device according to claim 3, wherein each signal processing unit is connected via a logic unit to the control line.

13. Device according to claim 10, wherein the logic unit comprises an OR gate.

14. Device according to claim 11, wherein the logic unit comprises an OR gate.

15. Device according to claim 12, wherein the logic unit comprises an OR gate.

16. Device according to claim 1, wherein the flow control information comprises a hold information indicating to the signal processing units receiving the hold information to stop processing.

17. Device according to claim 2, wherein the flow control information comprises a hold information indicating to the signal processing units receiving the hold information to stop processing.

18. Device according to claim 3, wherein the flow control information comprises a hold information indicating to the signal processing units receiving the hold information to stop processing.

19. Device according to claim 1, wherein each signal processing unit is usable for the transmit and receive mode.

20. A transceiver unit adapted to communicate with a buffer unit via a bus system, the transceiver unit comprising:
a transceiver controller; and
a communication device, both transceiver controller and communication device being interconnected, said communication device including a plurality of signal processing units connected in sequence, each signal processing unit being clocked by a common clock signal;

a mode line connected to each processing unit for switching each processing unit between a transmit mode and a receive mode; and a control line to which each signal processing unit is connected, the control line communicating flow control information either in the transmit mode to at least one of the preceding signal processing units or in the receive mode to at least one of the following signal processing units.

21. A transceiver unit adapted to communicate with a buffer unit via a bus system, the transceiver unit comprising:

a transceiver controller; and a communication device, both transceiver controller and communication device being interconnected, said communication device including a plurality of signal processing units connected in sequence, each signal processing unit being clocked by a common clock signal; and a control line to which each signal processing unit is connected, the control line communicating flow control information to stall at least one of the preceding signal processing units for feedback control of the signal processing units.

22. A transceiver unit adapted to communicate with a buffer unit via a bus system, the transceiver unit comprising:

a transceiver controller; and a communication device, both transceiver controller and communication device being interconnected, said communication device including a plurality of signal processing units connected in sequence thereby forming a signal processing chain, each signal processing unit being clocked by a common clock signal; and a control line to which each signal processing unit is connected, the control line communicating flow information to stall at least one of the signal processing units following the signal processing chain for feedforward control of the signal processing units.

23. Baseband system comprising:

a communication device including a plurality of signal processing units connected in sequence, each signal processing unit being clocked by a common clock signal;

a mode line connected to each processing unit for switching each processing unit between a transmit mode and a receive mode; and a control line to which each signal unit is connected, the control line communicating flow control information either in the transmit mode to at least one of the preceding signal processing units or in the receive mode to at least one of the following signal processing units.

* * * * *